United States Patent
Bauer et al.

(10) Patent No.: US 12,202,329 B2
(45) Date of Patent: Jan. 21, 2025

(54) METHOD AND A VEHICLE TEST STAND FOR TESTING A VEHICLE

(71) Applicant: KRISTL, SEIBT & CO ENGINEERS GESELLSCHAFT M.B.H., Graz (AT)

(72) Inventors: Robert Bauer, Graz (AT); Wilfried Rossegger, Graz (AT)

(73) Assignee: KRISTL, SEIBT & CO ENGINEERS GESELLSCHAFT M.B.H., Graz (AT)

(*) Notice: Subject to any disclaimer, the term of this patent is extended or adjusted under 35 U.S.C. 154(b) by 761 days.

(21) Appl. No.: 17/432,891

(22) PCT Filed: May 29, 2020

(86) PCT No.: PCT/AT2020/060219
§ 371 (c)(1),
(2) Date: Aug. 20, 2021

(87) PCT Pub. No.: WO2020/237278
PCT Pub. Date: Dec. 3, 2020

(65) Prior Publication Data
US 2022/0194211 A1    Jun. 23, 2022

(30) Foreign Application Priority Data

May 31, 2019 (AT) .............................. A 50500/2019

(51) Int. Cl.
G01M 9/04 (2006.01)
B60K 11/02 (2006.01)
G01M 15/02 (2006.01)
G01M 17/007 (2006.01)
G01M 99/00 (2011.01)

(52) U.S. Cl.
CPC ............... *B60K 11/02* (2013.01); *G01M 9/04* (2013.01); *G01M 15/02* (2013.01); *G01M 17/007* (2013.01); *G01M 99/002* (2013.01)

(58) Field of Classification Search
None
See application file for complete search history.

(56) References Cited

U.S. PATENT DOCUMENTS

| 10,183,548 B2 * | 1/2019 | Enomoto | B60H 1/00485 |
| 10,466,152 B2 * | 11/2019 | Gillette, II | G01N 33/2888 |
| 2010/0116040 A1 | 5/2010 | Hofer | |

(Continued)

FOREIGN PATENT DOCUMENTS

| AT | 11219 U2 | 6/2010 |
| AT | 518196 B1 | 11/2017 |
| DE | 4417953 A1 | 11/1995 |

(Continued)

OTHER PUBLICATIONS

ISA European Patent Office, International Search Report Issued in Application No. PCT/AT2020/060219, Aug. 31, 2020, WIPO, 4 pages.

*Primary Examiner* — Roy Y Yi
(74) *Attorney, Agent, or Firm* — McCoy Russell LLP

(57) ABSTRACT

The invention relates to a method for testing a vehicle comprising a vehicle test stand. Said vehicle test stand comprises a cooling agent and the vehicle comprises a tester with a cooling agent circuit. The cooling agent with the cooling agent circuit of the tester is connected to the tester for exchanging heat. The invention also relates to a vehicle test stand.

11 Claims, 5 Drawing Sheets

(56) References Cited

U.S. PATENT DOCUMENTS

2019/0041295 A1* 2/2019 Pfister .................. G01M 13/02

FOREIGN PATENT DOCUMENTS

| EP | 2562379 A1 * | 2/2013 | ................ F01P 7/14 |
| EP | 2573538 A2 | 3/2013 | |
| JP | 2010096611 A | 4/2010 | |
| WO | 2016177564 A1 | 11/2016 | |

* cited by examiner

METHOD AND A VEHICLE TEST STAND FOR TESTING A VEHICLE

CROSS REFERENCE TO RELATED APPLICATIONS

The present application is a U.S. National Phase of International Application No. PCT/AT2020/060219 entitled "METHOD AND VEHICLE TEST STAND FOR TESTING A VEHICLE," and filed on May 29, 2020. International Application No. PCT/AT2020/060219 claims priority to Austrian Patent Application No. A 50500/2019 filed on May 31, 2019. The entire contents of each of the above-listed applications are hereby incorporated by reference for all purposes.

TECHNICAL FIELD

The invention relates to a method and a vehicle test stand for the testing of a vehicle, wherein the vehicle test stand has a coolant conditioner, and the vehicle has an item under test with a coolant circuit.

BACKGROUND AND SUMMARY

Vehicle test stands are used to test vehicles by determining a variety of measured variables, such as emission values, noise generation, or heat development, of the vehicle, under predetermined test conditions. Here the attempt is made to subject the vehicle to relatively realistic conditions, so as to predict the behaviour of the vehicle when it is actually driving on the road. In order to simulate the environmental conditions when actually driving on the road, fans are deployed in a test of a vehicle with a vehicle test stand; these blow air as a form of headwind onto the vehicle that is to be tested. For better control of the driving conditions, such tests can be carried out in a test cell of the vehicle test stand, wherein the air in the test cell is sucked back in and supplied to the vehicle.

Such a vehicle test stand is of known art, for example, from JP 2010/096611 A, which describes a vehicle test stand with a vehicle radiator. The vehicle radiator blows cool air, from an opening at one end of a cooling fan duct, onto an engine of a vehicle that is to be tested. For better control of the cool air blown onto the vehicle, a cross-section of the opening of the cooling fan is enlarged or reduced by means of a mechanism. Furthermore, the opening of the cooling fan is adjustable in a horizontal and in a vertical direction so that the headwind onto the engine of the vehicle can be optimised.

However, the disadvantage here is that the air drawn in via the fan is subject to ambient conditions and thus does not correspond to the headwind of realistic driving conditions. In order to be able to modify the temperature of the air, the air in front of the fan can be at least partially heated or cooled, by means of a heat exchanger, through an air conditioning system, so as to enable alterations to a simulated headwind temperature on the vehicle test stand during the testing of the vehicle. In the event of rapid alterations to the desired headwind temperature, for example for the simulation of a tunnel entrance or exit, this procedure proves to be disadvantageous, as it is not possible to modify the temperature of the headwind rapidly, due to the high thermal inertia of the components.

In order to eliminate the disadvantage of the inertia of the headwind fan, as well as that of the radiator and the cooling circuit of the vehicle that is to be tested, EP 3 293 504 A1 shows a method for regulating or controlling the thermal conditions on a test stand, wherein a control unit is used, together with a first simulation model, to determine heat development momentarily and predictively. Based on the predicted heat development, a heat sink or a heat source is regulated or controlled accordingly, so as to maintain a defined required temperature of a test object. Here the heat exchange takes place in the heat sink or heat source by means of a direct exchange with a heat transfer medium. However, the temperature of the test object is manipulated directly, without a check on the cooling circuit of the vehicle.

A further method for reducing the thermal inertia of the cooling system in a vehicle or component test stand is disclosed in AT 518196 B1. Here a method for carrying out a test run on a test stand is shown, wherein at a measuring point at least one temperature is measured as a measured value, and at least one component of an item under test is divided into a number of segments. During the test run, the thermal interaction of at least one segment with the environment of the item under test is simulated by a thermal simulation model of the simulation model, in that the thermal simulation model calculates the segment heat flux supplied to, or dissipated from, the at least one segment, and the said segment heat flux is adjusted on the test stand on the at least one segment by means of a number of heat flux actuators, which impose a heat flux on the item under test, as a function of the measured temperature. In the case of a component test stand, heat flux actuators for the transfer of heat from or to the item under test can be a wide variety of devices that transfer heat and can impose heat fluxes on the components of the item under test. For example, water or air heat exchangers, fluid flow devices (e.g. fans, venturi flow devices), Peltier elements, spray nozzles for spraying with liquids such as water, etc., can be considered. In the same way, a fan of the test stand or a media conditioning unit of the conditioning unit, for example an intake air conditioning system, a charge air conditioning system, an oil conditioning unit, or a cooling water conditioning unit of an internal combustion engine, can also be used as a heat flow actuator. However, a disadvantage of the method in AT 518196 B1 is that when testing an entire vehicle a heat exchange takes place directly between the components of the item under test and the heat flow actuators.

The object of the present invention is to alleviate or eliminate at least some of the disadvantages of methods and vehicle test stands of known art for the testing of a vehicle. In particular, the invention aims to create a method and a vehicle test stand in which dynamic temperature alterations of the environment, caused by the testing driving conditions of a vehicle that is to be tested, can be imposed on the vehicle using the cooling circuit of the vehicle.

The invention provides a method for the testing of a vehicle with a vehicle test stand, wherein the vehicle test stand has a coolant conditioner, and the vehicle has an item under test with a coolant circuit, wherein the coolant conditioner is connected to the coolant circuit of the item under test, for purposes of heat exchange with the item under test.

In this way, the aforementioned object is achieved.

Accordingly, the invention also provides a vehicle test stand for the testing of a vehicle, having a coolant conditioner, wherein the vehicle that is to be tested has an item under test with a coolant circuit, wherein the coolant conditioner can be connected into the coolant circuit of the item under test for purposes of heat exchange with the item under test.

In this way also, the aforementioned object is achieved.

Here the coolant conditioner is thermally connected to the coolant circuit of the item under test of the vehicle that is to be tested, such that heat can be removed from, or supplied to, the coolant circuit of the item under test, by means of the coolant conditioner. This direct exchange of heat between the coolant conditioner and the coolant circuit of the item under test can eliminate the thermal inertia of the air conditioning system, air and a radiator, while still allowing for the thermal inertia of the coolant circuit of the item under test in the testing of the vehicle. For example, an item under test of the vehicle may be an internal combustion engine, an electrical machine, a frequency converter, a fuel cell, power electronics, or a high voltage battery. In this context "heat exchange" means either the heat transfer from the coolant conditioner to the item under test, or the heat transfer from the item under test to the coolant conditioner. Advantageously, a temperature of a coolant of the coolant circuit is thereby adapted much more rapidly to dynamic alterations of a realistic environment for the vehicle being tested, which is being simulated on the test stand. A further advantage is that a fan for the conditioning of the air used to simulate a headwind can have smaller dimensions, or can be omitted.

In accordance with a preferred form of embodiment, a radiator (a cooler) of the vehicle is separated from the coolant circuit of the item under test, before the coolant conditioner is connected into the coolant circuit of the item under test. In this way, the coolant circuit can be directly conditioned by means of the coolant conditioner without any additional modification of the conditioning of the coolant circuit of the item under test by a radiator of the vehicle.

For optimal heat transfer between the coolant conditioner and the item under test, it is beneficial if a coolant can be guided between the coolant conditioner and the item under test. Here the coolant is routed from the coolant conditioner, via the coolant circuit of the item under test to the item under test, and back again to the coolant conditioner. This ensures am optimum heat transport between the coolant conditioner and the item under test. Advantageously, the coolant conditioner has an open coolant circuit, which is connected into the coolant circuit of the item under test, for purposes of the circulating transport of the coolant between the coolant conditioner and the item under test.

Furthermore, it is beneficial if the vehicle test stand includes a control device, wherein the control device comprises a simulation model, wherein a supply flow temperature of the coolant of the cooling circuit can be determined by means of the simulation model, and a cooling performance of the coolant conditioner can be controlled as a function of the supply flow temperature determined. The controllable cooling performance of the coolant conditioner allows the amount of heat absorbed by the cooling circuit to be adjusted, and thus the temperature of the item under test to be regulated. Advantageously, the simulation model calculates in real time, based on the test conditions of the vehicle, the supply flow temperature of the coolant of the cooling circuit of the item under test that the vehicle would have under realistic driving conditions. Here the supply flow temperature is the temperature of the coolant in the direction of flow, upstream of the item under test. Using the supply flow temperature determined by means of the simulation model, the simulation model calculates the cooling performance that must be expended by the coolant conditioner so that the coolant is cooled such that the supply flow temperature as determined is achieved. Thus, by means of the simulation model and the coolant conditioner, more precise dynamic alterations of the cooling circuit of the item under test are possible for the testing of a vehicle, having regard to real driving conditions.

In accordance with a preferred form of embodiment, the control device can be connected to a temperature sensor for the measurement of a return flow temperature of the coolant, and/or to a flow meter for the measurement of a mass flow rate of the coolant, and the simulation model is configured to determine the supply flow temperature of the coolant as a function of the return flow temperature of the coolant, and/or the mass flow rate of the coolant. This allows the supply flow temperature of the coolant to be calculated more accurately, and controlled more quickly by means of the coolant conditioner.

In accordance with a preferred form of embodiment, the supply flow temperature of the coolant is determined as a function of the driving cycle that is to be tested. In this way, the coolant conditioner can be controlled predictively so as to regulate the supply flow temperature of the coolant of the cooling circuit of the item under test, in that information on future driving conditions can be taken into account by the simulation model.

In accordance with a further preferred form of embodiment, the coolant conditioner has a cooling register and an electrical heater. This means that coolant conditioners already of known art, and widely used in the prior art, can be used for the rapid regulation of the supply flow temperature.

It is beneficial if the coolant conditioner is arranged adjacent to the vehicle that is to be tested. This allows the coolant conditioner to be arranged on the vehicle test stand independently of the vehicle being tested.

Furthermore, it is beneficial if the coolant is a liquid cooling water, which preferably contains water and antifreeze. Thus, commercially-available coolants can be used as the coolant of the cooling circuit of the item under test.

BRIEF DESCRIPTION OF THE FIGURES

The invention is further explained below, with reference to non-limiting examples of embodiment that are shown in the drawings.

DETAILED DESCRIPTION

Figure 1:
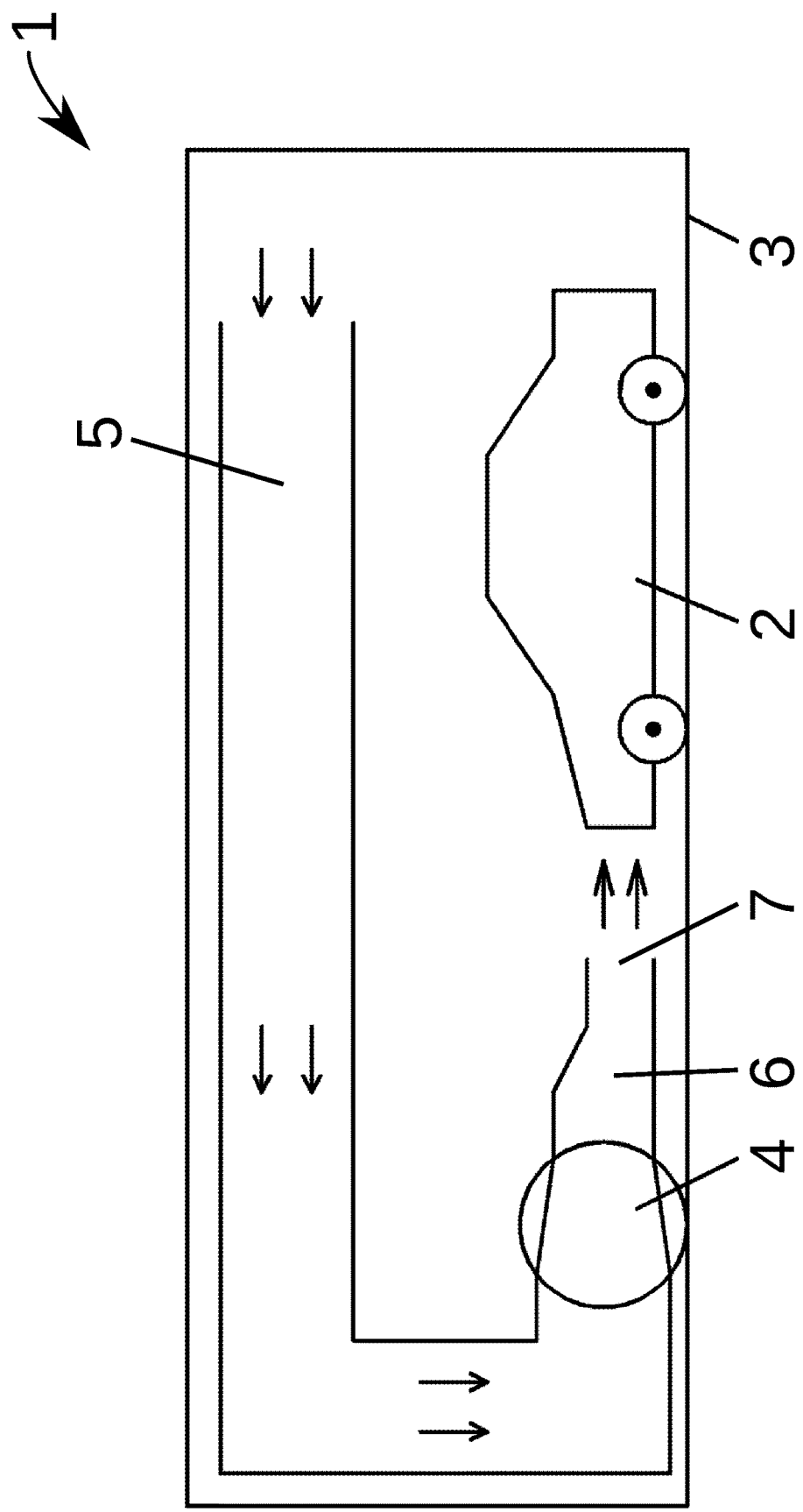
FIG. 1 shows schematically a vehicle test stand in accordance with the prior art.

FIG. 1 shows a vehicle test stand 1 for the testing of a vehicle 2 in accordance with the prior art. The vehicle test stand 1 has a test cell 3, in which the vehicle 2 that is to be tested is arranged, with the exclusion of any environmental influences. Furthermore, a fan 4 is arranged in the test cell 3, to which an intake device 5 and an exhaust device 6 are attached. The vehicle 2 that is to be tested is arranged in the test cell 3 such that the exhaust device 6 is arranged upstream of the front face of the vehicle 2, so that an opening 7 of the exhaust device 6 is positioned in front of the radiator grille of the vehicle 2. In order to generate a headwind during the testing of the vehicle 2 for the simulation of a realistic driving mode of the vehicle 2, air is sucked from the test cell 3 by means of the fan 4 by way of the intake device 5, and transported to the exhaust device 6 by way of the fan 4. By way of the opening 7 of the exhaust device 6, the air flows as a headwind in the direction of the radiator grille of the vehicle 2, and flows around the radiator of the vehicle 2 so as to remove heat (see FIG. 3). The velocity of the headwind can be regulated by controlling the power of the fan 4. The air flowing out of the opening 7 of the exhaust device 6 is drawn in again via the intake device 5 by virtue of the closed test cell 3, so that the air is circulated in the test cell 3.

Figure 2:
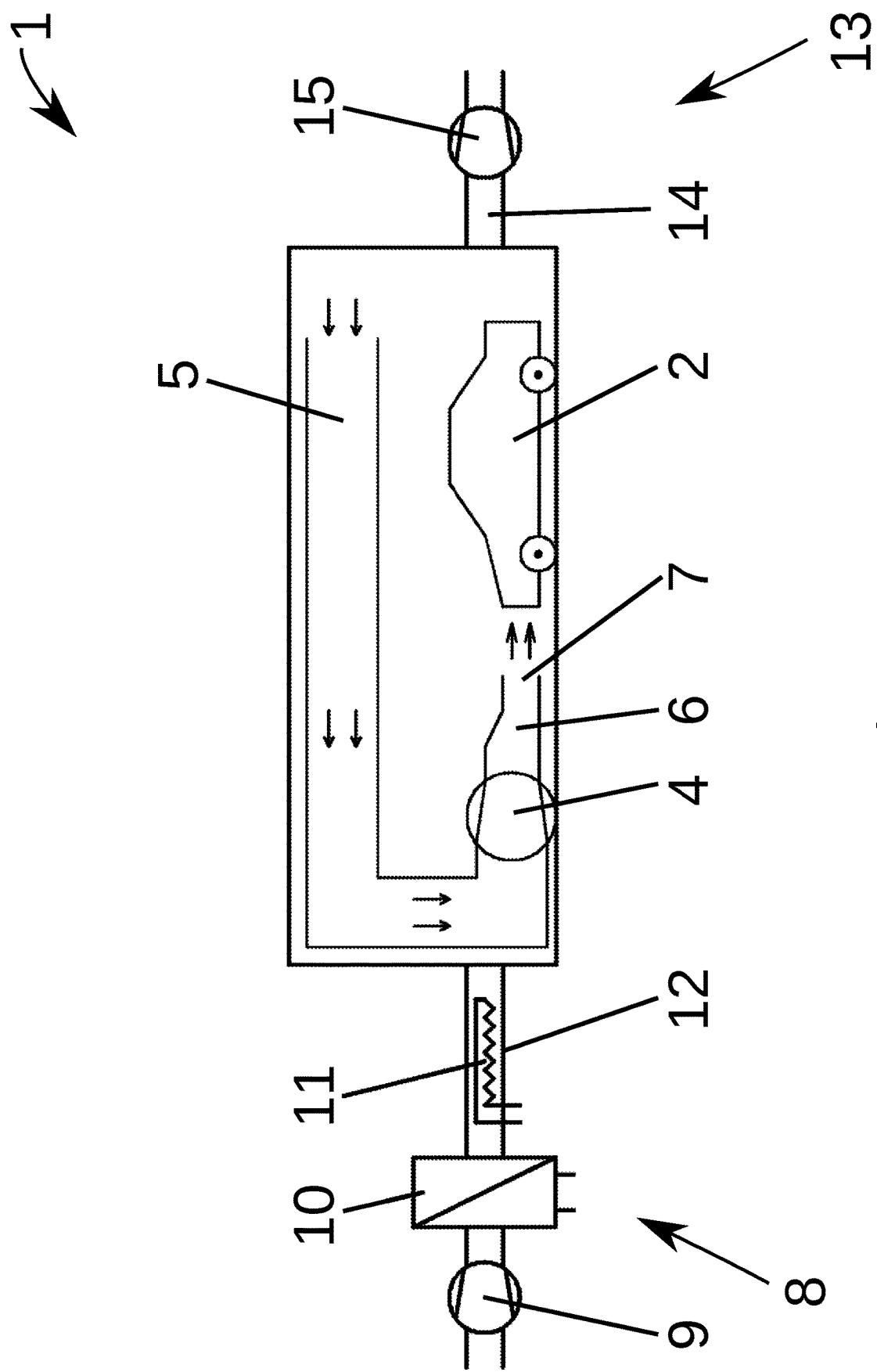
FIG. 2 shows schematically another vehicle test stand in accordance with the prior art.

FIG. 2 shows another vehicle test stand 1 in accordance with prior art, which has an air conditioner 8 so as to control, in addition to the velocity, the temperature of the headwind during the testing of the vehicle 2 in the test cell 3 of the vehicle test stand 1. The air conditioner 8 has a compressor 9, a heat exchanger 10, and a heater 11, which are arranged on a pipe 12, wherein the pipe 12 is connected to the intake device 5. Ambient air is drawn into the pipe 12 by way of the compressor 9, and is heated by means of the heat exchanger 10 and the heater 11 arranged in the pipe 12. The heated ambient air then enters the intake device 5, and mixes with the air from the test cell 3 that is drawn in via the intake device 5. The air that results from the mixing is warmer than the air drawn in by the intake device 5, and is blown by way of the fan 4 and the exhaust device 6 as a headwind in the direction of the vehicle 2. In order to cool the air in the test cell 3, and subsequently the headwind, the air drawn in via the pipe 12 can also be cooled by means of the heat exchanger 10. Here the heater 11 is switched off. To ensure that the amount of air in the closed test cell 3 of the vehicle test stand 1 remains approximately constant, despite the air drawn in via the pipe 12, the test cell 3 has an exhaust system 13, which includes a further pipe 14, leading from the test cell 3 into the environment, and a further fan 15 arranged on the further pipe 14. Air can be transported from the test cell 3 into the surrounding environment via the further pipe 14 by means of the fan 15.

Figure 3:
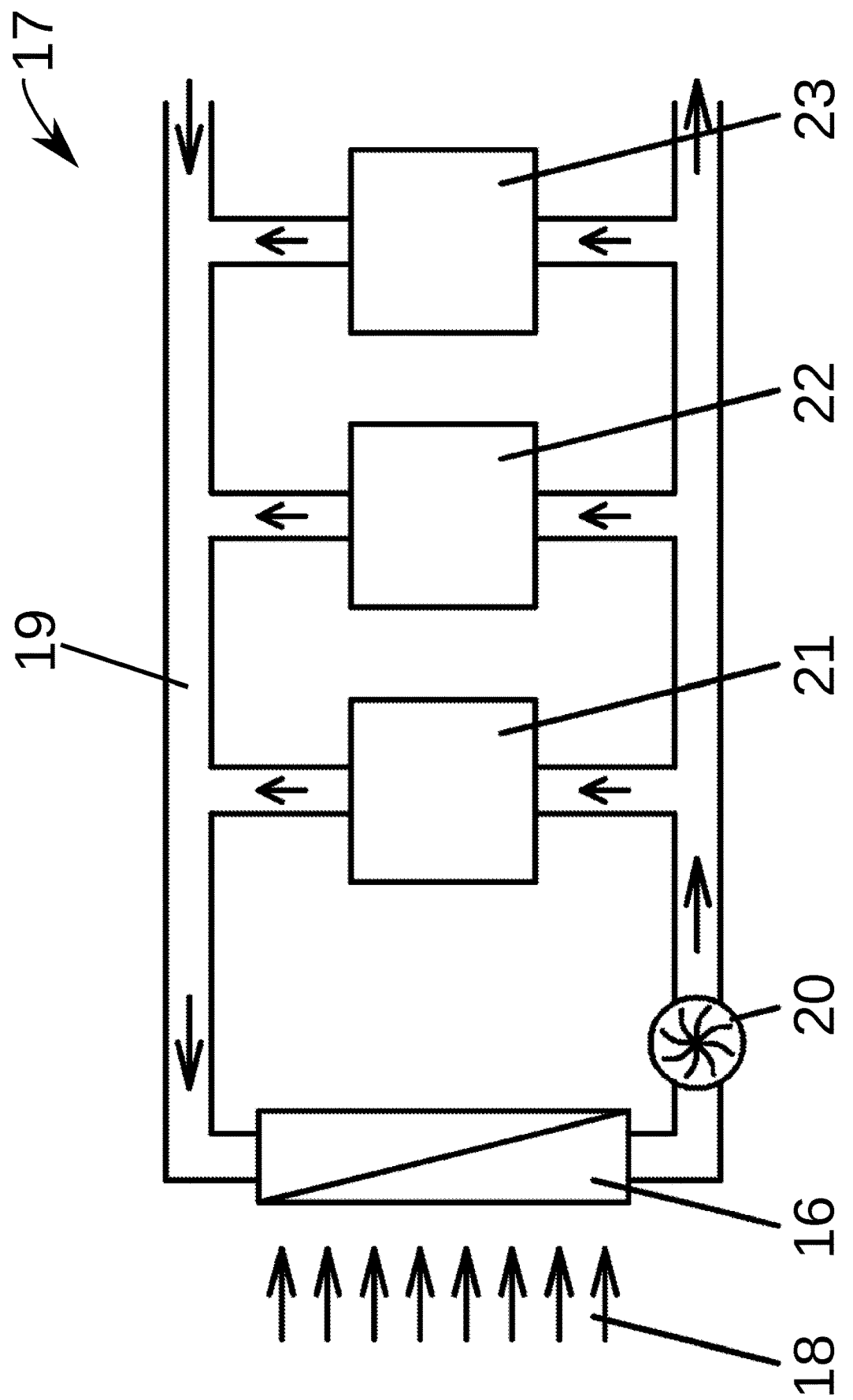
FIG. 3 shows schematically a cooling circuit of a vehicle in accordance with the prior art.

FIG. 3 shows a radiator 16 and a cooling circuit 17 of the vehicle 2 that is to be tested in the vehicle test stand 1 shown in FIG. 1 or 2 in accordance with prior art. The air flowing by way of the opening 7 of the exhaust device 6 is blown as a headwind 18 in the direction of the radiator grille of the vehicle 2, and flows around the radiator 16 of the vehicle 2 so as to dissipate heat. The radiator 16 is designed as a heat exchanger, and is connected to a fluid line 19 of the cooling circuit 17 for the transport of a coolant. The coolant is a liquid cooling water, which contains water and antifreeze. By means of the fluid line 19, which is connected to the radiator 16 and to items under test of the vehicle 2, a coolant is circulated between the radiator 16 and the items under test by means of a pump 20. In the form of embodiment shown in FIG. 3, the items under test of the vehicle 2 are an internal combustion engine 21, an electrical machine 22, and a frequency converter 23. Each individual item under test has a cooling circuit, which is formed as a sub-circuit of the cooling circuit 17 of the vehicle 2 between the respective item under test and the radiator 16. Heat that is generated during the testing of the vehicle 2 by the internal combustion engine 21, the electrical machine 22, and the frequency converter 23, is transferred to the coolant and transported via the fluid line 19 to the radiator 16 of the vehicle 2. Heat transfer from the coolant to the headwind 18 takes place in the radiator 16, and thus heats up the headwind 18.

In the form of embodiment shown in FIG. 2, an alteration in the supply flow temperature of the coolant of the vehicle 2 by means of the headwind 18, after it has left the radiator 16, and before it is supplied to the items under test is very sluggish, since the temperature and mass flow rate of the air drawn in via the pipe 12 is altered by means of the compressor 9, the heat exchanger 10 and the heater 11, and by an alteration of the mixing ratio of the air sucked in via the intake device 5 and the air sucked in via the pipe 12, an air flow with a defined mass flow rate and defined temperature is established in the exhaust device 6. After exit from the opening 7 of the exhaust device 6, this desired air flow then flows around the radiator 16 of the vehicle 2 as a headwind 18, and thus regulates the heat to be dissipated by the coolant of the cooling circuit 17, and, subsequently, the supply flow temperature of the coolant upon exit from the radiator 16.

Figure 4:
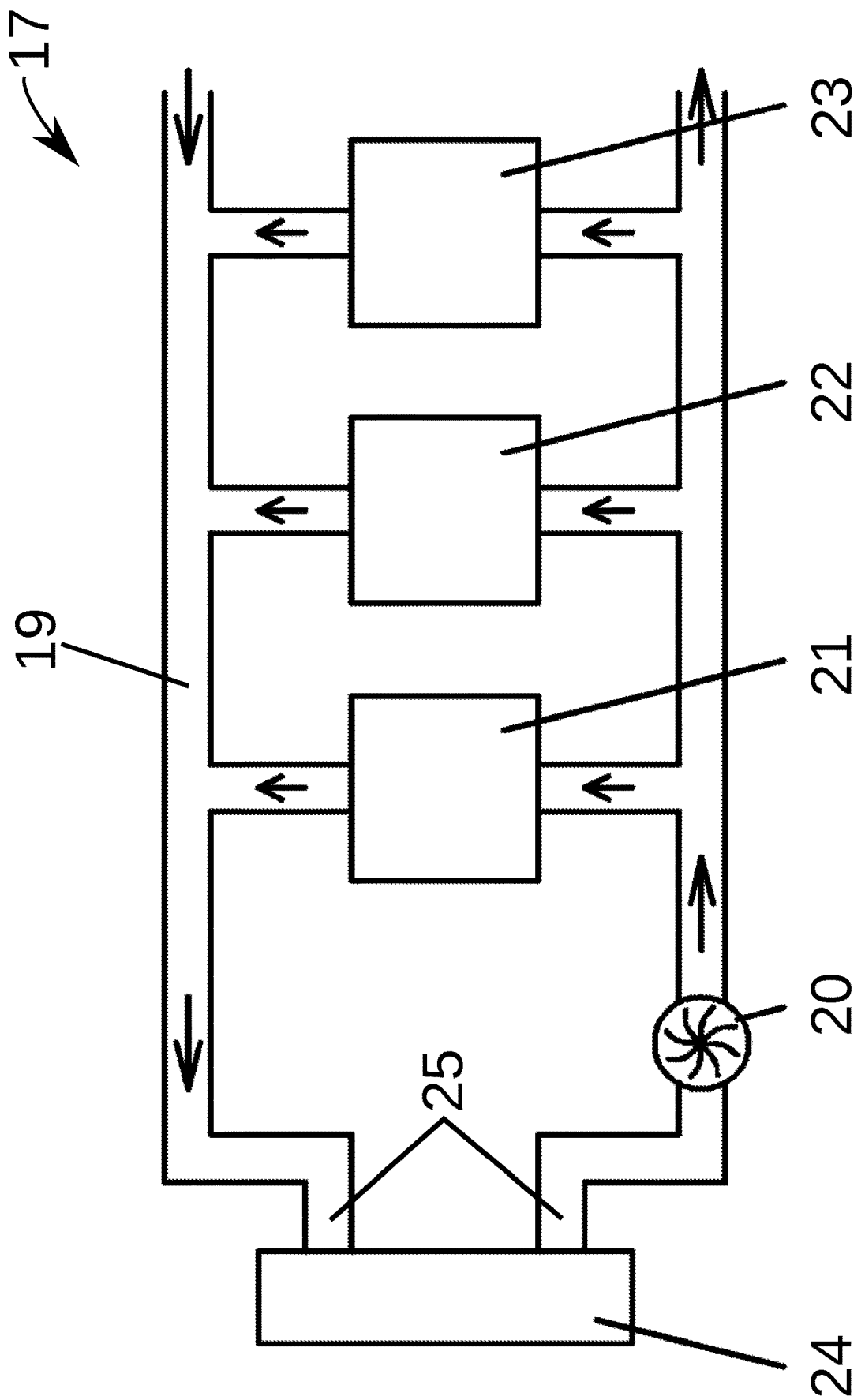
FIG. 4 shows schematically a detail of an inventive vehicle test stand in the vicinity of a coolant conditioner.

In order to simulate a rapid alteration in the desired temperature of the headwind 18 when testing the vehicle 2 on the vehicle test stand 1, and to enable a rapid alteration in the supply flow temperature of the coolant of the cooling circuit 17 of the vehicle 2, a coolant conditioner 24, in accordance with the invention, is connected into the coolant circuit 17 of the vehicle 2 that is to be tested, as in the example of embodiment shown in FIG. 4. Here the coolant conditioner 24 is connected into the coolant circuit of each item under test of the vehicle 2, in that the coolant conditioner 24 is connected into a position of the coolant circuit 17 of the vehicle, which position forms part of all the coolant circuits of the items under test. In the example of embodiment shown in FIG. 4, the radiator 16 of the vehicle 2 is disconnected from the coolant circuit 17 of the vehicle 2, and the coolant conditioner 24 is connected into the coolant circuit 17 of the vehicle 2 instead of the radiator 16. Here the coolant conditioner 24 is arranged adjacent to the vehicle 2 that is to be tested on the vehicle test stand 1, and another fluid line 25 of the coolant conditioner 24 is connected into the fluid line 19 of the coolant circuit 17. Thus, the coolant of the coolant circuit 17 of the vehicle 2 can be routed between the coolant conditioner 24 and the items under test. In the form of embodiment shown in FIG. 4, the coolant conditioner 24 has a cooling register and an electrical heater, so as to heat or cool the coolant of the vehicle 2 flowing through the coolant conditioner 24. The direct contact of the coolant conditioner 24 with the coolant of the cooling circuit 17 enables a rapid alteration in the supply flow temperature of the coolant.

Figure 5:
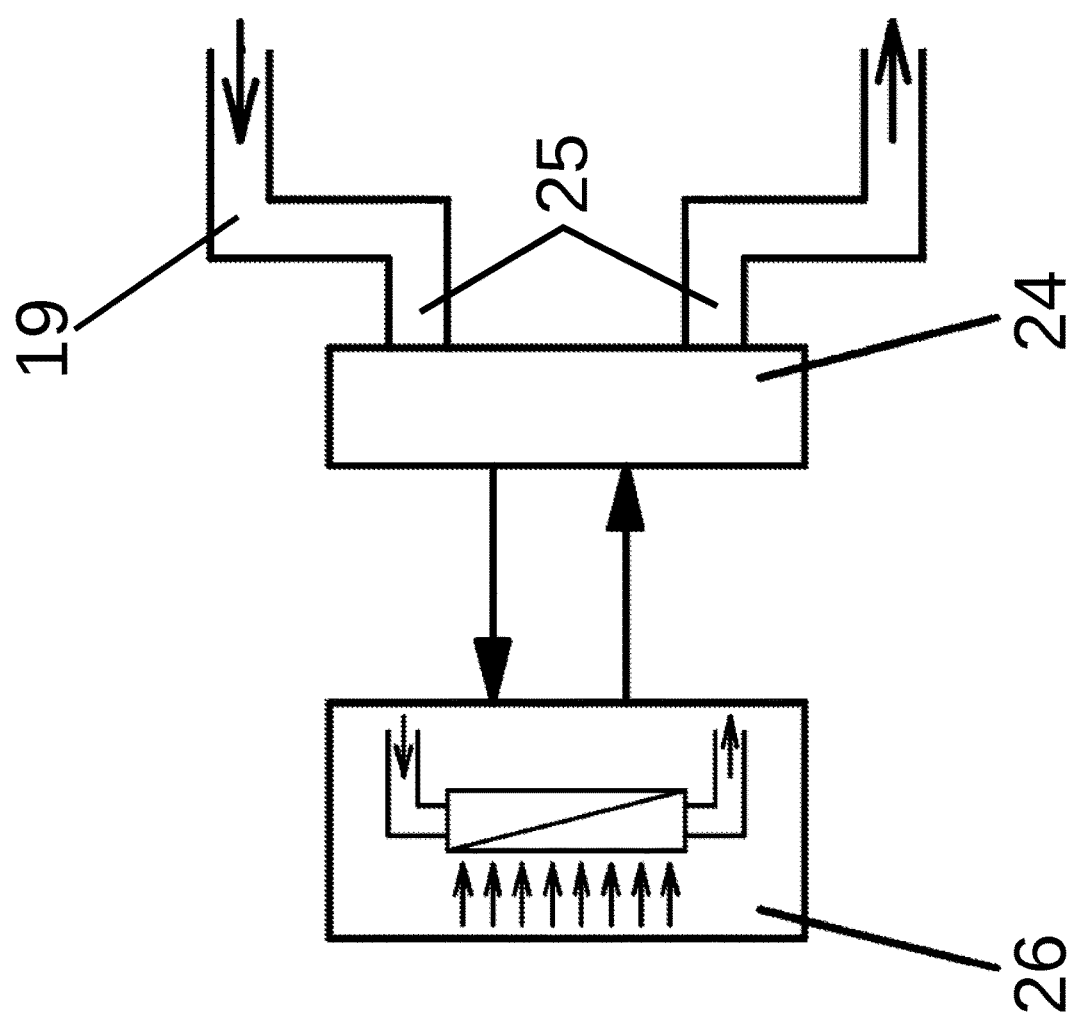
FIG. 5 shows schematically a detail of a further inventive vehicle test stand in the vicinity of a coolant conditioner.

FIG. 5 shows a detail of a further inventive vehicle test stand 1 in the region of the coolant conditioner 24. As in the form of embodiment shown in FIG. 4, the coolant conditioner 24 is connected via the further fluid line 25 to the fluid line 19 of the coolant circuit 17 of the vehicle 2 that is to be tested, so that the coolant can be transported from the items under test of the vehicle 2 to the coolant conditioner 24 for the dissipation or absorption of heat. In the form of embodiment shown in FIG. 5, the vehicle test stand 1 in addition has a control device 26, which includes a simulation model. Furthermore, the vehicle test stand 1 has a first temperature sensor (not shown), for the measurement of the supply flow temperature of the coolant, and a second temperature sensor (not shown), for the measurement of a return flow temperature of the coolant, wherein the return flow temperature is measured before the coolant enters the coolant conditioner 24. Furthermore, in the form of embodiment shown in FIG. 5, the vehicle test stand 1 has a flow meter (not shown), for the measurement of a mass flow rate of the coolant in the coolant circuit 17. The two temperature sensors, the flow meter, and the coolant conditioner 24, are connected to the control device 26. Taking into account the return flow temperature and the mass flow rate of the coolant as well as the temperature, the velocity, the density and the humidity of a fictitious headwind, the simulation model of the control device 26 determines a supply flow temperature of the coolant that the coolant, under the given boundary conditions, would have under realistic driving conditions. Here the fictitious headwind is the headwind that would flow over the vehicle under realistic driving conditions. As a function of the supply flow temperature determined by means of the simulation model, the control device 26 controls a cooling performance of the coolant conditioner 24, so as to achieve the supply flow temperature of the coolant determined. In order to control the supply flow temperature of the coolant in a predictive manner, the supply flow temperature can also be determined by the simulation model as a function of the driving cycle that is to be tested.

The invention claimed is:

1. A method for a testing of a vehicle with a vehicle test stand, wherein the vehicle test stand comprises a coolant conditioner, and the vehicle comprises an item under test with a coolant circuit, wherein the coolant conditioner is connected into the coolant circuit of the item under test, for purposes of heat exchange with the item under test, and a coolant is guided between the coolant conditioner and the item under test, wherein a supply flow temperature of the coolant of the coolant circuit is determined by means of a simulation model, and a cooling performance of the coolant conditioner is controlled as a function of the supply flow temperature determined, wherein the supply flow temperature of the coolant is determined as a function of a temperature, and/or a velocity, of a simulated headwind.

2. The method according to claim 1, wherein a radiator of the vehicle is disconnected from the coolant circuit of the item under test, before the coolant conditioner is connected into the coolant circuit of the item under test.

3. The method according to claim 1, wherein, the supply flow temperature of the coolant is determined as a function of a driving cycle that is to be tested.

4. A vehicle test stand for the testing of a vehicle comprising a coolant conditioner, wherein the vehicle that is to be tested comprises an item under test with a coolant circuit, wherein, the coolant conditioner is configured to connect with the coolant circuit of the item under test for purposes of heat exchange with the item under test such that a coolant can be guided between the coolant conditioner and the item under test, wherein a control device of the vehicle test stand has a simulation model, wherein the simulation model is configured to determine a supply flow temperature of the coolant of the coolant circuit, wherein the control device is configured to control a cooling performance of the coolant conditioner as a function of the supply flow temperature determined, wherein the simulation model is configured to determine the supply flow temperature of the coolant as a function of a temperature, and/or a velocity, of a simulated headwind.

5. The vehicle test stand according to claim 4, wherein, the control device can be connected to a temperature sensor for a measurement of a return flow temperature of the coolant, and/or to a flow meter for a measurement of a mass flow rate of the coolant, and the simulation model is configured to determine the supply flow temperature of the coolant as a function of the return flow temperature of the coolant, and/or the mass flow rate of the coolant.

6. The vehicle test stand according to claim 4, wherein, a fan for the simulation of a headwind, is provided, wherein the control device is connected to a further temperature sensor for a measurement of a temperature of the headwind, and/or a velocity measuring device for a measurement of a velocity of the headwind, and the simulation model is configured to determine the supply flow temperature of the coolant as a function of the temperature, and/or the velocity, of the headwind.

7. The vehicle test stand according to claim 4, wherein, the coolant conditioner has a cooling register and an electrical heater.

8. The vehicle test stand according to claim 4, wherein, the coolant conditioner is arranged adjacent to the vehicle that is to be tested.

9. The vehicle test stand according to claim 4, wherein, the coolant is a liquid cooling water.

10. The method according to claim 1, wherein the supply flow temperature of the coolant is determined as a function of a return flow temperature of the coolant, and/or a mass flow rate of the coolant.

11. The vehicle test stand according to claim 9, wherein the liquid cooling water contains water and antifreeze.

\* \* \* \* \*